United States Patent
Todd et al.

(10) Patent No.: US 11,108,891 B1
(45) Date of Patent: Aug. 31, 2021

(54) HUMAN TRUST OVERLAYS FOR AUTOMATED DATA CONFIDENCE FABRICS

(71) Applicant: EMC IP Holding Company LLC, Hopkinton, MA (US)

(72) Inventors: Stephen J. Todd, Center Conway, NH (US); Jason A. Shepherd, Austin, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/835,889

(22) Filed: Mar. 31, 2020

(51) Int. Cl.
- *H04L 29/06* (2006.01)
- *H04L 12/24* (2006.01)
- *G06F 8/60* (2018.01)
- *H04L 29/08* (2006.01)

(52) U.S. Cl.
CPC .............. *H04L 67/42* (2013.01); *G06F 8/60* (2013.01); *H04L 41/22* (2013.01); *H04L 67/1044* (2013.01); *H04L 67/18* (2013.01)

(58) Field of Classification Search
CPC ..... H04L 67/42; H04L 67/1044; H04L 41/22; H04L 67/18; G06F 8/60
See application file for complete search history.

(56) References Cited

U.S. PATENT DOCUMENTS

2019/0103092 A1* 4/2019 Rusak .................. G06F 40/35
2019/0228262 A1* 7/2019 Gonzalez ........... G06K 9/00791

OTHER PUBLICATIONS

Polonski, "The Hard Problem of AI Ethics—Three Guidelines for Building Morality Into Machines", Feb. 28, 2018, The OECD Forum Network, 9 pages. (Year: 2018).*

Splunk, "The Modern Enterprise Data Fabric: Helping the Public Sector Transform Digitally", Jan. 23, 2017, Splunk, industry perspective, 8 pages. (Year: 2017).*

Liu, et al., "Human Machine Joint Decision Making in Distorted Surveillance Scenario", 2019 2nd China Symposium on Cognitive Computing and Hybrid Intelligence (CCHI), IEEE Xplore: Nov. 18, 2019, 6 pages (Year: 2019).*

Polonski, Dr. Vyacheslav; *The Hard Problem of AI Ethics—Three Guidelines for Building Morality Into Machines*, Published Feb. 28, 2018. https://www.oecd-forum.org/users/80891-dr-vyacheslav-polonski/posts/30743-the-hard-problem-of-ai-ethics-three-guidelines-for-building-morality-into-machines.

* cited by examiner

*Primary Examiner* — Arvin Eskandarnia
*Assistant Examiner* — Chhian (Amy) Ling
(74) *Attorney, Agent, or Firm* — Workman Nydegger

(57) ABSTRACT

A social overlay is provided that allows an application to seek human input when performing high-risk decisions. The overlay allows an application to obtain data confidence scores when performing operations and to obtain human confidence scores that can be used to seek input from users with high confidence scores. This allows applications to improve performance and avoid situations where an automated application may make a wrong decision that does not account for the associated risk.

20 Claims, 10 Drawing Sheets

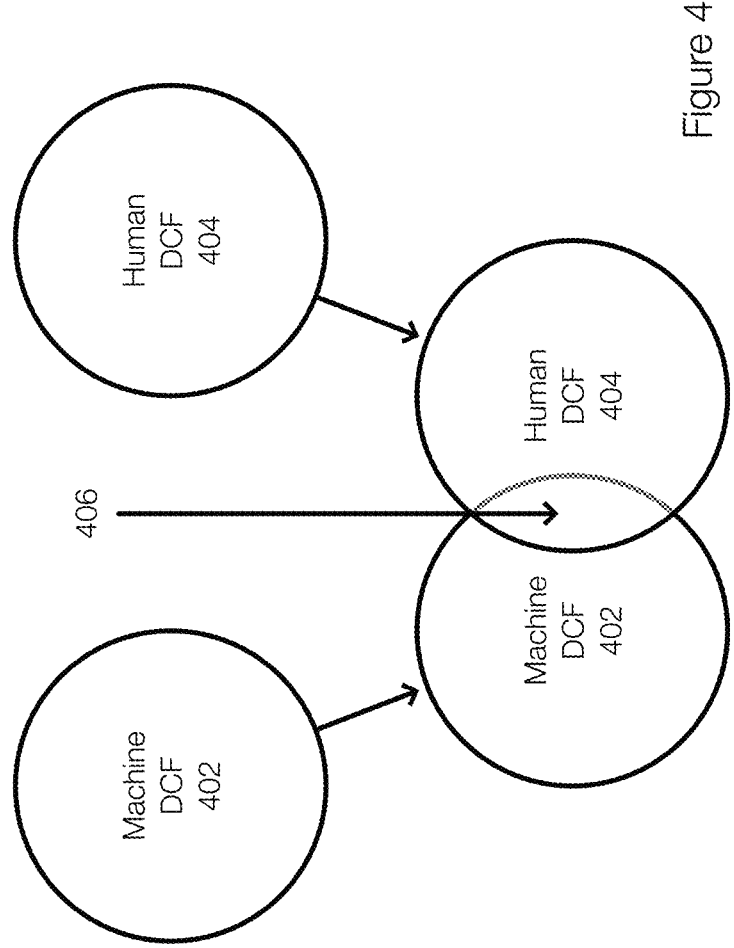

HUMAN TRUST OVERLAYS FOR AUTOMATED DATA CONFIDENCE FABRICS

FIELD OF THE INVENTION

Embodiments of the present invention generally relate to data confidence fabrics (DCFs). More particularly, at least some embodiments of the invention relate to systems, hardware, software, computer-readable media, and methods for increasing the confidence in automated algorithms by helping the decisions with additional input and by preventing substantial damage.

BACKGROUND

There are many examples of algorithms or applications that have made very poor choices. Automated applications, when faced with decisions that have ethical, moral, and business implications may make the wrong decision and the consequences can be very damaging. Consider the repercussions when chatbots interact with consumers using racist or genocidal language, of deny service based on discriminatory rulesets, or proliferate inaccurate propaganda. Even assuming that the application may be provided with highly trusted data, there is no mechanism that allows the application to know that the decisions made from this data have severe moral or ethical consequences.

More specifically, an application that fully trusts the underlying data may still cause significant damage (e.g., financial, reputational) to a corporation. The application may, for example, violate the privacy of consumers or employees, damage corporate reputational integrity, or violate legal or compliance requirements. Blaming the application for a poor decision is inadequate to remedy the damage.

There may be situations where the output of an application results in the loss of life. An application may not perform an identification process correctly or may be responsible for lethal autonomous weapons. Making a wrong decision while controlling an autonomous car may result in loss of life. Actuation commands in a manufacturing setting may also lead to loss of life.

There is a trend in application development to try and recognize these gray areas (e.g., ethical, business, moral implications). Even if an application is able to recognize a gray area, the solution is typically to wait for human authorization. However, this often introduces a delay that has an associated cost.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 4 illustrates an example of an overlay that allows a machine data connection fabric to be connected to a human data connection fabric;

DETAILED DESCRIPTION OF SOME EXAMPLE EMBODIMENTS

Figure 1:
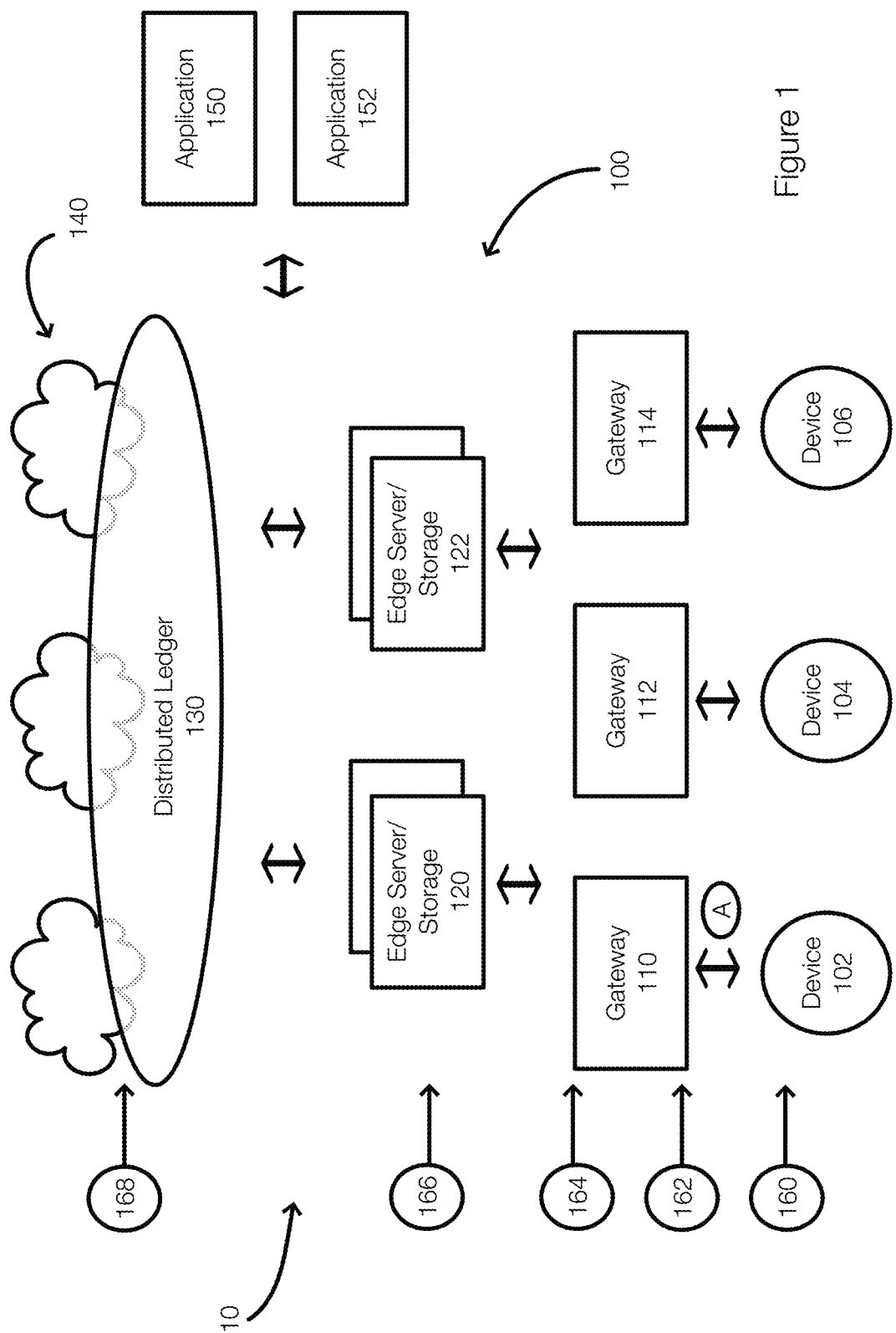
FIG. 1 illustrates an example of a machine data connection fabric.

Embodiments of the present invention generally relate to ecosystems such as data confidence fabrics (DCFs) and to performing trust operations therein. Embodiments of the invention further relate to DCFs that facilitate user input in automated decision applications or algorithms. Embodiments of the invention further relate DCFs that introduce a user overlay that allows for trusted user input.

DCFs are generally computing systems that gather data from edge devices. The DCFs measure the reliability or trustworthiness of the data before forwarding the data (and/or associated measurements/metadata) upstream for application consumption. The DCFs are configured to give the data a confidence score that reflects the trustworthiness of or confidence in the data. The confidence score allows applications (and users) to have a degree of confidence in their operations.

However, there are certain environments where applications may make decisions based on the data in the DCF that may have significant consequences. For example, some decisions may have business critical consequences, moral or ethical ramifications, and may result in loss of life. Embodiments of the invention introduce a user overlay into or available to the DCF where the automated algorithms may not want to rely on machine-generated confidence scores.

In one example, a DCF, by way of example and not limitation, may relate to both hardware and/or software and/or services. A DCF is an example of an architecture and set of services that allow data to be ingested into a system for use by applications. The DCF adds or provides trust information or scores to the data as the data flows through the DCF. Ultimately, the ingested data is associated with a trust or confidence score that provides a view into the trustworthiness of the data to an application or other use.

More particularly, at least some embodiments of the invention relate to systems, hardware, software, computer-readable media, and methods for implementing a user overlay or a user confidence overlay in a DCF.

The following disclosure discusses trust insertion in a DCF prior to discussing the user overlay. As data flows from data sources to storage or to applications in a DCF ecosystem, scores can be attached to or associated with the data. As the data flows in the DCF, different forms of trust insertion technology handle or process the data. As the data is handled by various forms of trust insertion technology, the overall score or ranking (e.g., a confidence or trustworthiness score) of the data may change. The data scored or ranked in the DCF system may be stored in various locations, such as a data lake, in a datacenter, in a distributed ledger, or the like. The data scored or ranked in the DCF system can be made available to one or more applications or other clients or users.

By ranking or scoring data, an application is able to explore or exploit the data for potential analysis or consumption. The score or rank of the data allows an application to understand or account for the trustworthiness of the data. For example, the confidence score of the data may have a significant impact on whether the data is actually used by the application. An application may require a minimum confidence score or have other requirements related to the confidence score.

For example, an application operating in a secure facility may need to use data that is very trustworthy (have a high confidence score) while data that is used by an application to control lights in a home may not need to be as trustworthy (a lower confidence score is acceptable). A DCF is able to give or associate data with scores from individual trust insertion technologies that can be combined in multiple ways to determine a final score or rank that relates to the trustworthiness of the data.

FIG. 1 illustrates an example of a computing network that includes or implements a DCF. FIG. 1 illustrates an example of a computing network that includes a DCF 100. The network 10 may include different network types including Internet capable networks, edge computing networks, cellular or telecommunications networks or the like or combination thereof.

FIG. 1 illustrates devices 102, 104 and 106. These devices 102, 104 and 106 may generate data that is ingested into the DCF 100. For example, the devices 102, 104 and 106 may be sensors, smartphones, edge devices, or other data sources. The data generated by the devices 102, 104 and 106 may depend on various factors and purposes. For example, the device 102 may be a smartphone device that is capable of generating a wide variety of data. In one example, location related data generated by the device 102 may be useful to the application 150 if the application 150 is a map generating application. If the device 104 is a weather sensing device, the data produced by the device 104 may be useful to a weather related application such as the application 152. Embodiments of the invention thus relate to a wide variety of devices, applications, and networks.

The data generated at the devices 102, 104 and 106 may be ingested through a gateway, such as the gateways (GWs) 110, 112 and 114. A gateway, by way of example only, may be configured to receive data from devices such as edge devices and perform processing on the data. The gateways 110, 112, and 114 may deliver the data to servers/storage 120 and 122. The servers can store the data, perform processing, or the like. The DCF 100 may be associated with a distribute ledger 130 (e.g., a multi-cloud distributed ledger) that allows data to be recorded more securely. The cloud 140, which may include multiple clouds from different providers, may also provide other processing, storage, and computing resources. The applications 150 and 152 can be distributed in the network 10 and be part of the DCF 100 and may operate at different levels and/or locations.

In this example, the applications 150 and 152 may interact with edge data from the devices 102, 104 and 106 with knowledge of the trustworthiness (e.g., a confidence score) of the data being ingested into the DCF 100. In each layer of the DCF 100, data and applications are being brought together with known confidence scores in this example.

When implementing the DCF 100, trust insertion technologies are examples of tools that can be used to increase the confidence in edge data. Examples of trust insertion technologies include, but are not limited to, hardware root of trust capabilities, co-processors and accelerators, digital signatures, identity management, secure ingest software, encryption, immutable storage, data protection policies, distributed ledgers, or the like or combination thereof.

The number and type of trust insertion technologies is large and each may be associated with a different trust increase. Differences or disparities in the trustworthiness of these technologies can impact the overall trustworthiness of the DCF. Some components or technologies are better able to insert or add trust to data flowing in the network.

When a DCF is implemented, however, the trustworthiness of the data is improved. Because the DCF 100 may include multiple trust insertion technologies, confidence scores can be changed at multiple locations as the data is ingested into the DCF 100.

In FIG. 1, data A is generated by the device 102. IoT (Internet of Things) capable devices sensors, smartphones, computers, tablets, and the like are examples of the device 102. The data A is ingested into the DCF 100 and flows through the DCF 100. After flowing through the DCF, the data A may be stored in a repository that can be accessed by the application 150 (or another application). The data A may also be stored at various locations while flowing through the DCF 100.

The DCF 100 may be implemented on a wide variety of devices and networks. When data is collected on an edge of a network, the data may flow through various levels of hardware environments that have various levels of processing, memory, and storage capabilities. From a hardware perspective, the data may flow from the data-generating device 102 to a server computer or to a gateway device 110. The server computer or gateway 110 may send the data to another server that is configured to aggregate data from multiple gateways. That server may send the data to a storage environment where the data can be accessed and used by applications.

In this path, different devices, services, or applications may handle or process the data. Typically, each interaction with the data may be associated with a trust insertion, where trust metadata is inserted with or associated with the ingested data. When the data reaches the application or is stored, the data is thus stored or associated with a trust or confidence score and/or metadata used to determine or calculate the trust or confidence score. The data and/or the associated score may be scored immutably.

In this example of FIG. 1, each of the devices and/or services and/or applications that handle the data may adjust or change the trustworthiness of the data. This is often achieved by contributing to the score of the data. More specifically, in one example, this is achieved by providing a score that impacts the trustworthiness score or rank of the data. Typically, the scores are cumulative: each trust insertion technology contributes to the overall confidence score. Embodiments of the invention allow the score or rank to be computed using more than simple addition. Other formulations may also be implemented, such as multiplication, addition, weighting, and/or combination thereof or the like. More specifically, the overall confidence score can be determined from the individual scores using addition, multiplication, weighting, other scoring algorithms, or the like or combination thereof.

FIG. 1 illustrates examples of trust insertion technologies 160, 162, 164, 166 and 168. The trust insertion technologies include, by way of example and not limitation: trust technology 160 where the devices are signing their data (hardware root of trust signatures on device data); trust technology 162 where the ingest software rejects non-authorized/non-authenticated application access to the data (strong N-S-E-W authentication/authorization); trust insertion technology 164, where provenance metadata is appended to the data from the devices (provenance metadata attachment such as information about a data capture environment); trust insertion technology 168, where data is stored onto a cryptographically-protected object store (secure immutable scale-out edge persistence); and trust technology 168, where a record of the data/metadata is registered in a distributed ledger (e.g., registration of trusted assets in a multi-cloud distributed ledger).

The confidence added by these trust insertion technologies can be stored with the data or in another location such as a distributed ledger. As the data A traverses the DCF 100, scores are added to the data and results in a confidence score that can be used by an application. For example, an application may only use data that has a threshold confidence score. The applications can account for the confidence scores as they execute.

Figure 2:
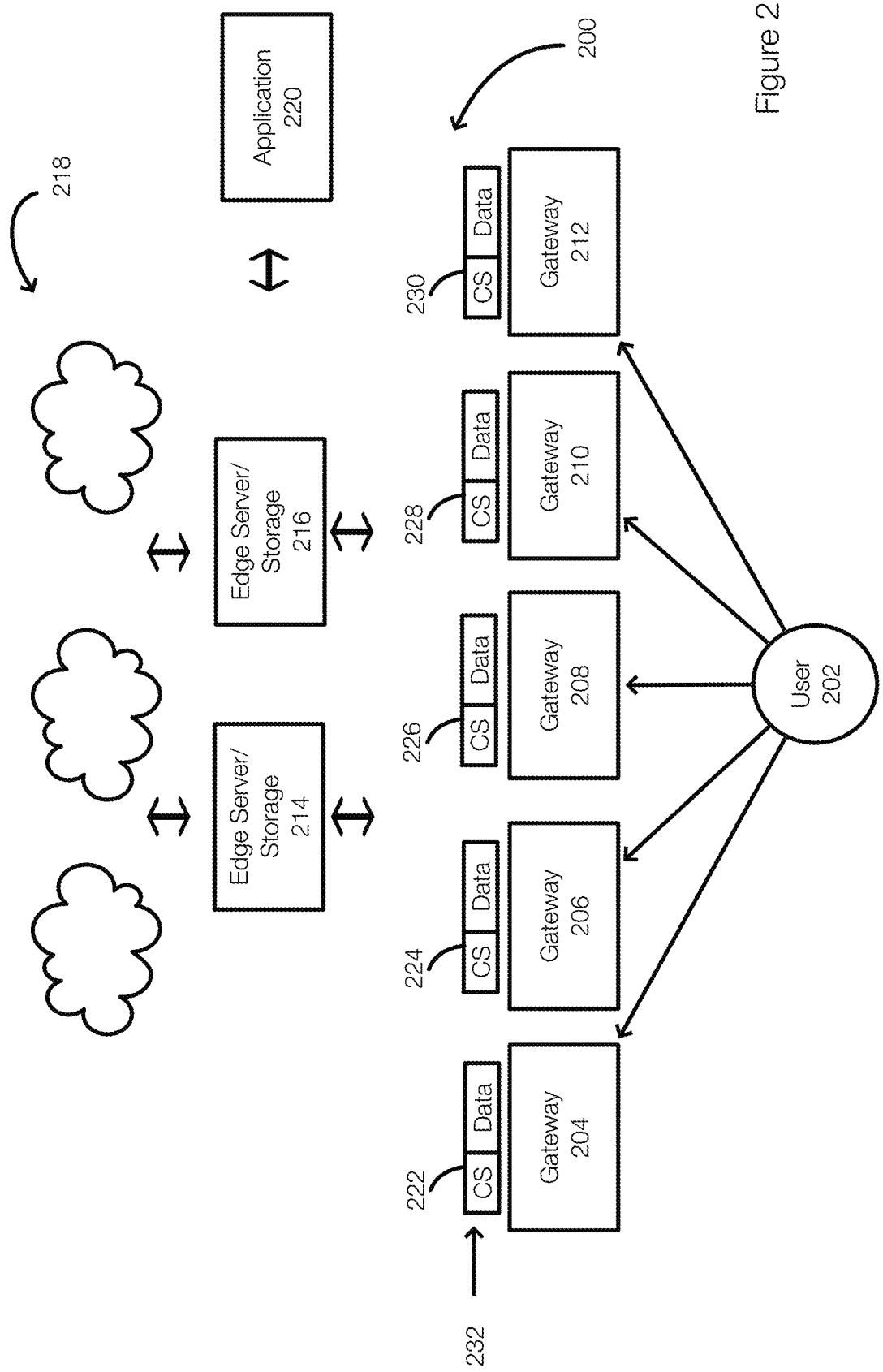
FIG. 2 illustrates an example of a human data connection fabric.

FIG. 2 illustrates another example of a human DCF. An example of a human DCF is disclosed in U.S. Ser. No. 16/663,965 filed Oct. 25, 2019, which is incorporated by reference in its entirety. FIG. 2 illustrates an example of a human DCF 200 that is configured to generate confidence scores associated with users or humans, while FIG. 1 illustrates an example of a machine DCF 100 that generates confidence scores for data. The DCF 200 is configured to generate confidence scores that can be applied to or associated with a particular person or user. Further, confidence scores can be generated for multiple characteristics such as, but not limited to: morality skill, knowledge, trustworthiness and dependability.

In the DCF 200, a user 202 may be associated with multiple gateways such as gateways 204, 206, 208, 210 and 212. These gateways generate output that may include data/metadata and a confidence scores 232, represented as outputs 222, 224, 226, 228, and 230. In this example, the user 202 may enable trust measurement, the DCF 200 may gather input or monitor the user and generate confidence scores. An application 220 may measure the confidence.

More specifically, the gateways 204, 206, 208, 210, 212 may be, respectively, a camera 204 that captures a video of the user 202, a home assistant 206 (e.g., Amazon Echo) that captures audio data, a personal laptop 208 that may capture keystrokes, an AR/VR device 210 that watches the user's 202 skills and reactions as they perform a task, or a mobile device 212 that has location-based services enabled. The confidence scores 232 (which may be signed and immutable) are transmitted within the DCF 200 to edge servers/storage 214 and 216 and may also be stored in the cloud 218. The confidence scores 232 of the user 202 can be used by an application.

Figure 3:
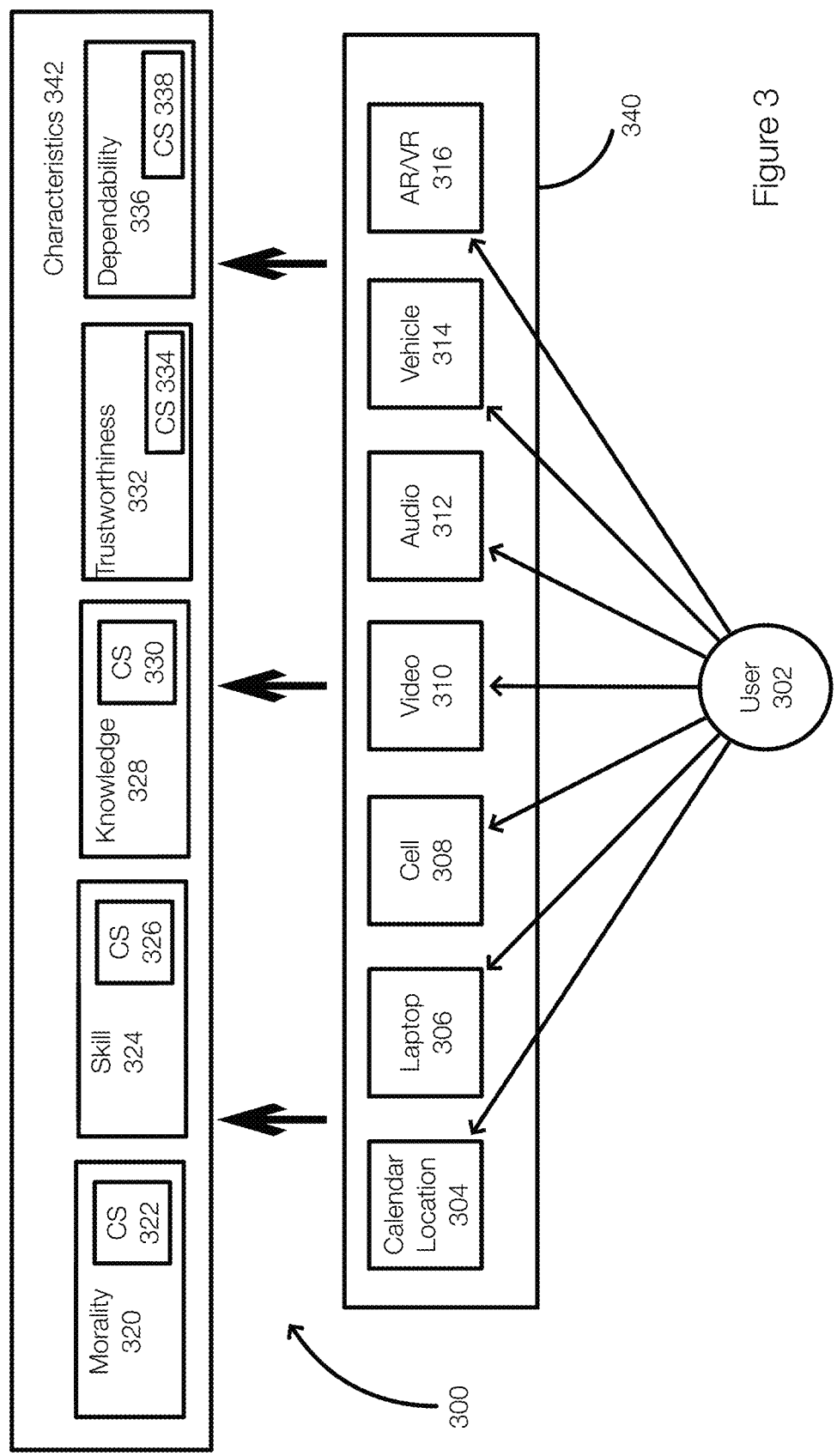
FIG. 3 illustrates additional detail about the human data connection fabric.

FIG. 3 further illustrates aspects of a human DCF. The DCF 300 can be adapted to multiple users. FIG. 3 may illustrate a portion of the DCF 300 that is specific to a user 302. However, the DCF 300 can accommodate multiple users and may also be configured to protect user identity.

In one example, confidence generators 340 may be associated with the user 302. The confidence generators 340 are typically configured to collect data and generate confidence scores, which may be associated with confidence measurements, and other data/metadata. These scores and other data are typically signed.

For example, a calendar/location 304 may be configured to combine measurements or input from a calendar and location-based services (e.g., GPS). This allows the calendar location 304 to generate a confidence score at least related to dependability 336. The confidence score (CS) 338 may identify whether the user 302 is dependable. The laptop 306 may include a set of analytic algorithms that can evaluate the honesty (based on the user's appearance in video), their knowledge 328 based on how the user 302 speaks, what they type, how articulate they are. The laptop 306 may be able to evaluate their overall knowledge, oral and written knowledge, or the like. These confidence scores may be added to the user's knowledge 328 CS 330, the skill 324 CS 326, and their morality 320 CS 322.

The cell 308 may also perform analytic functions similar to the laptop 306 and may also add measurements such as or related to activity and motion. The video 310 may be a camera that can observe behavior in a larger setting with more people. Audio 312 may also contribute confidence scores to the characteristics of the user 302. The vehicle 314 may be able to provide information related to whether the user 302 is obedient to traffic laws, whether they drive aggressively, or whether the user 302 follows suggested commands. The AR/VR/MR (augmented reality, virtual reality, mixed reality) 316 can follow the user 302 as the user works through instructions on how to fix or preplace a part and can evaluate the user's ability to follow directions, timeliness, thoroughness, effectiveness, and the like.

The various confidence generators 340 thus generate confidence scores that are accumulated to the confidence scores 322, 326, 330, 334, and 338 of, respectively, morality 320, skill 324, knowledge 328, trustworthiness 332, and dependability 336. It is understood that these characteristics are presented by way of example only.

The skill 324 CS 326 may accumulate data from multiple confidence generators. As a result, the CS 326 may be an average, a weighted average, or the like of confidence scores from multiple generators. The confidence scores of the other characteristics 342 may be similarly determined. The user 302 may also be associated with an overall confidence score, which may be a combination of the individual confidence scores of the characteristics 342.

The DCF 300, which is an example of the DCF 200, is generating confidence in the ability of the user 302 to perform certain tasks, make certain decisions, or solve certain problems including business problems. For example, if the DCF 300 is implemented in a factory and associated with the workers in the factory, the DCF may generate confidence scores for the workers or users with regard to performing certain tasks. When a task arises that requires certain input, the DCF or the confidence scores generated by the DCF 300 can be used to select a specific user and seek input from that specific user. The user selected by an application may vary according to the requirement. For example, a highly skilled person may be needed for one task while a dependable and trustworthy person may be needed for a different task.

FIG. 4 illustrates an example of a DCF overlay. FIG. 4 illustrates a machine DCF 402 and a human DCF 404. The DCF 402 and the DCF 404 may be associated with an organization or entity, a geography, or the like. For example, the DCF 402 and the DCF 404 may be located in a similar geography such as a manufacturing floor.

The machine DCF 402 may receive or ingest telemetry data from sensors or devices (e.g., temperature sensors, humidity devices, robot-arms, for manufacturing, or the like). The ingested data is scored as previously discussed. An application that relies on the data ingested and scored by the DCF 402 can have a level of confidence in the ingested data. However, the ability of the machine DCF 402 to make decisions in gray areas (e.g., ethical, moral, loss of life, business) is limited.

The human DCF 404 generates confidence scores for users or workers in the manufacturing floor (or other locations). The actions of a human, as illustrated in FIG. 3, are captured and the overall confidence score or trustworthiness of the workers can be determined by the human DCF 404.

FIG. 4 illustrates a DCF overlay 406 that allows the DCF 402 and the DCF 404 to be combined or used together in a beneficial manner. The overlay 406, for example, may allow an application to make decisions in the grey area more quickly and with more confidence. The overlay 406 can increase confidence in cases or situations where automated applications may not want to rely on machine generated confidence scores.

Figure 5A:
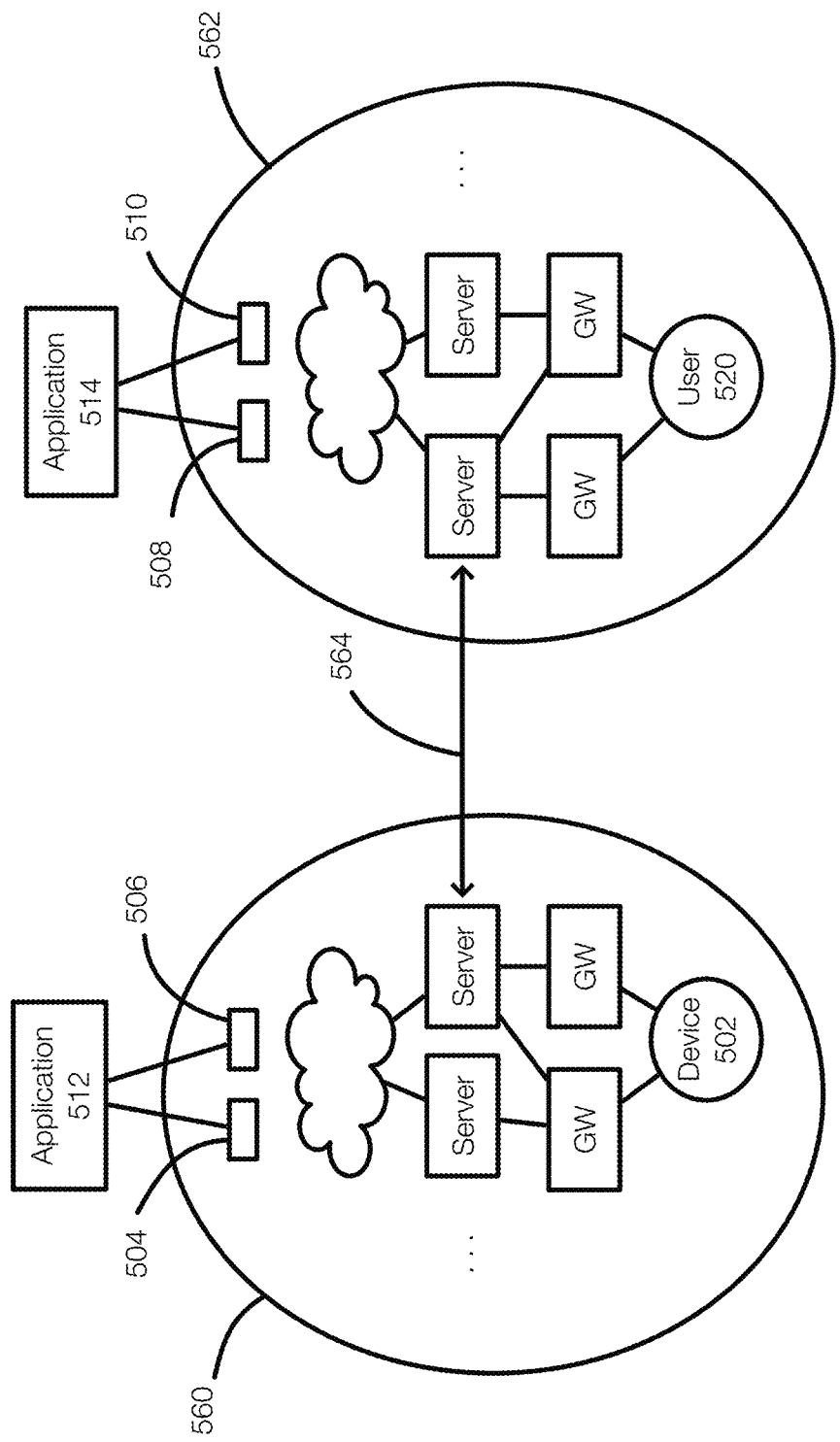
FIG. 5A illustrates an example of an overlay that includes a network connection.

An overlay can be achieved in different ways. FIG. 5A illustrates an example of an overlap between a machine DCF 560 and a human DCF 562. The DCF 560 is configured to ingest data from a device 502 and generate confidence scores 504 and 506 that are associated with the data ingested from the device 502. As previously stated, the data may pass through various layers.

The DCF 562 ingests data or generates data related to a user 520. The confidence scores 508 and 510 relate to the user 520 and may be an overall confidence score or confidence scores for various characteristics of the user 520.

In this example, the application 512 may use the data generated by the device in conjunction with the confidence scores 504 and 506. Similarly, the application 514 may use the confidence scores 508 and 510 associated with the user 520 in various ways.

FIG. 5A further illustrates an example of creating a social overlay between the DCF 560 and the DCF 562. FIG. 5A illustrates and the DCF 560 is networked 564 to the DCF 562. In this example, the network connection enables connectivity between the machine DCF 560 and the human DCF 562.

Figure 5B:
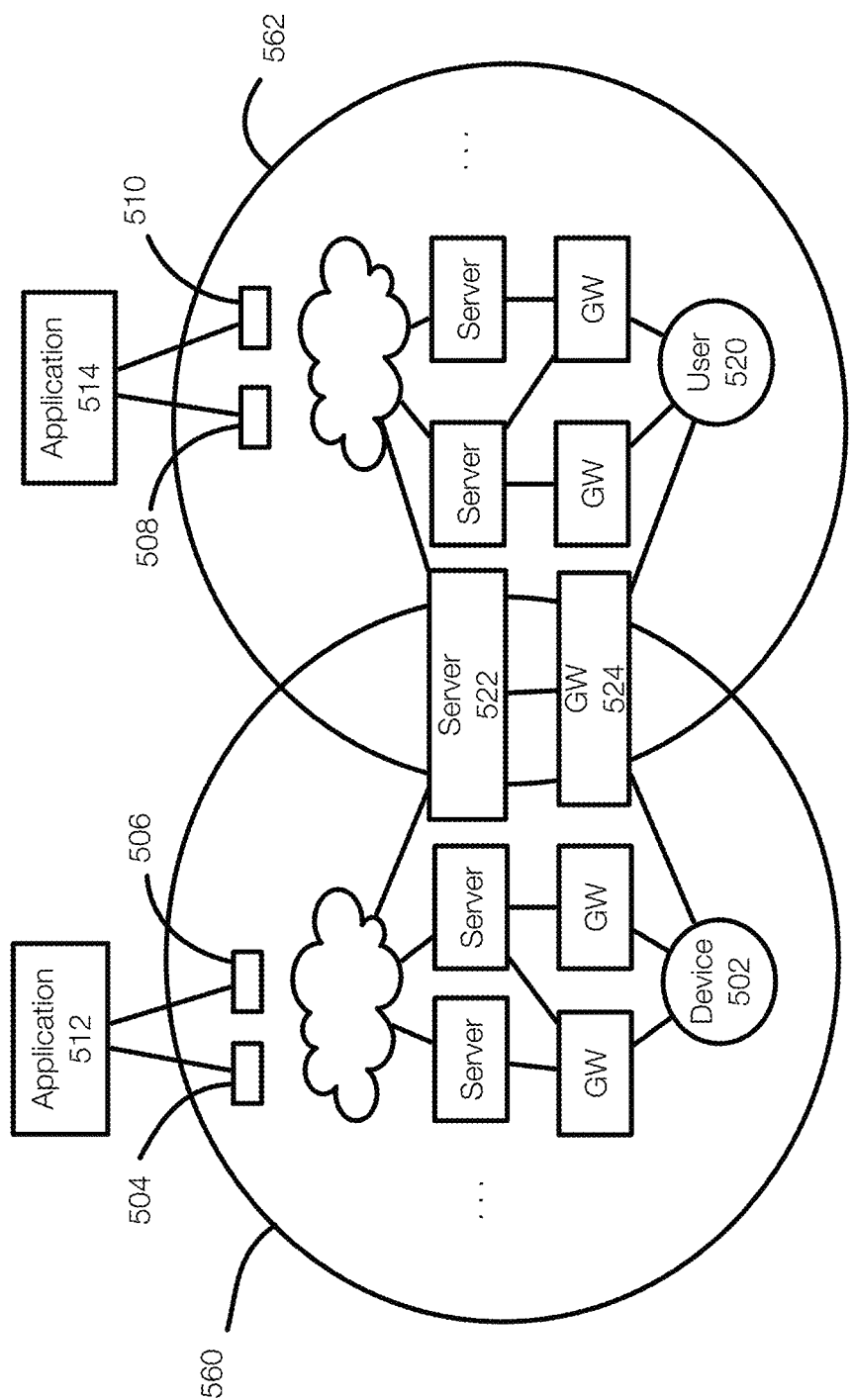
FIG. 5B illustrates an example of an overlay that includes shared hardware between at least two data connection fabrics.

FIG. 5B illustrates another example of creating a social overlay between the DCF 560 and the DCF 562. In this example, the DCF 560 and the DCF 562 share hardware including a gateway 524 and/or a server 522 and or other hardware.

Figure 5C:
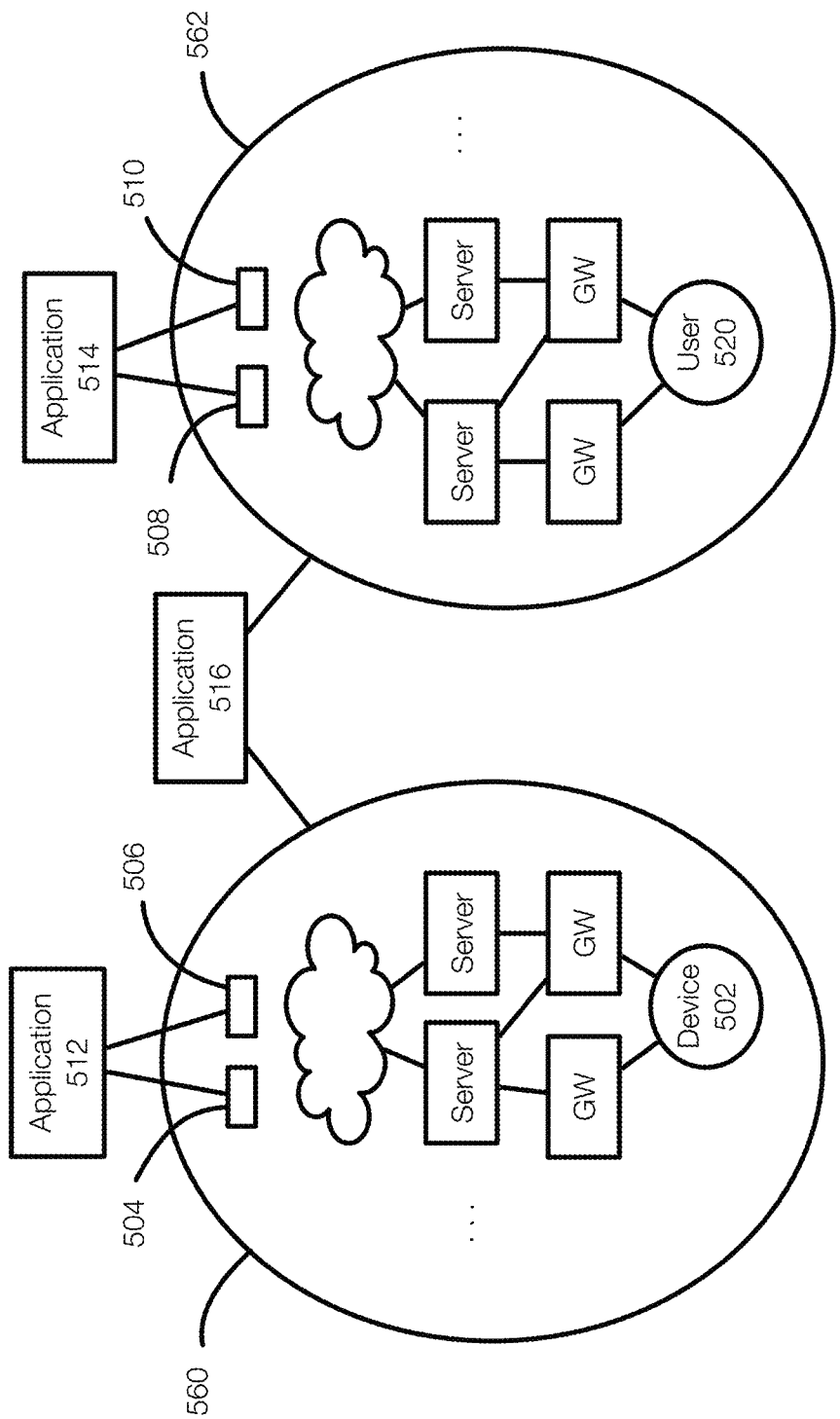
FIG. 5C illustrates an example of a cloud-based overlay that allows an application to access multiple data connection fabrics.

FIG. 5C illustrates another example of creating a social overlay between the DCF 560 and the DCF 562. FIG. 5C illustrates an application or cloud-integrated overlay. This allows an application, such as the application 516, to analyze data from more than one DCF. In addition, the application 516 may also send actuation commands.

Figure 6:
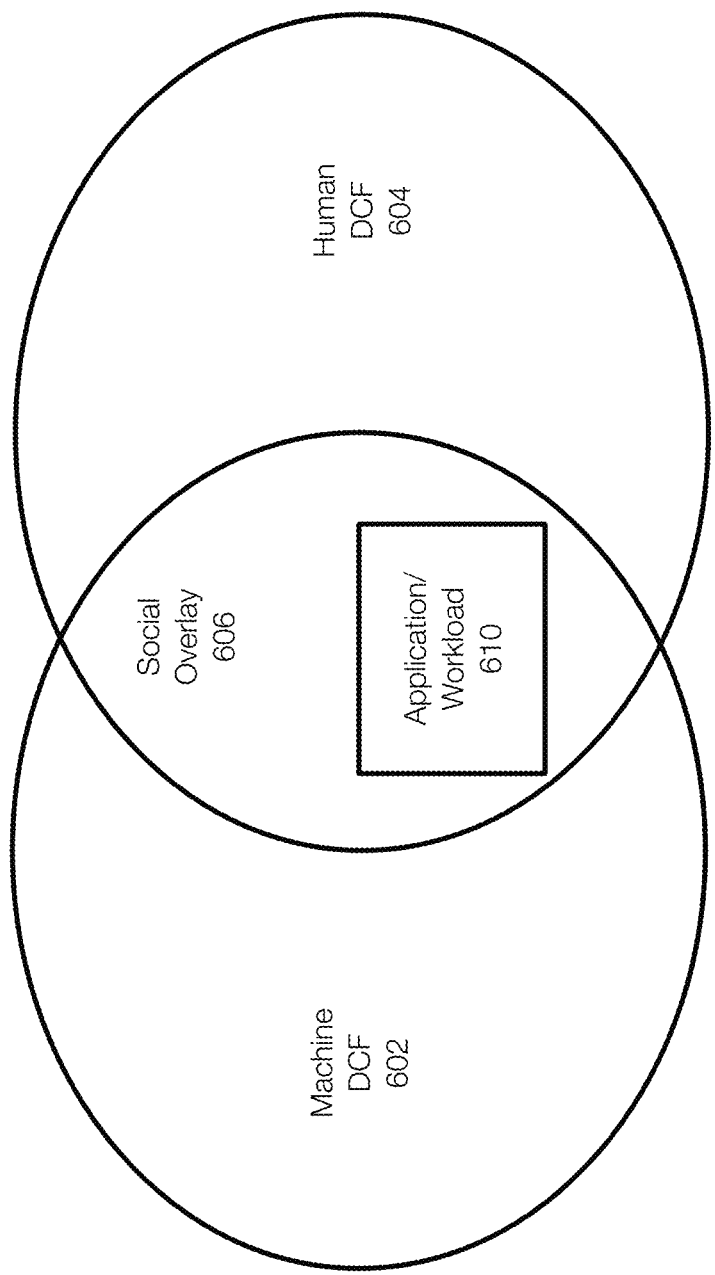
FIG. 6 illustrates an example of an application or workload deployed to an overlay connecting data connection fabrics.

Workloads that leverage social overlays, such as illustrated in FIGS. 5A-5C can be written and deployed into the social overlay. FIG. 6 illustrates an example of an application that is deployed into the social overlay. FIG. 6 illustrates an overlay 606 between a machine DCF 602 and a human DCF 604. An application or workload 610 has been deployed to the social overlay 606.

The application 610, by being deployed in a social overlay 606 or by having access to the social overlay 606, is able to run workloads in which trusted information about relevant human actors or users can be used to make fast decisions in a high-risk situation. The application 610 can use the trusted information to make decisions in grey areas such as ethical area, mission critical areas, loss of life areas, and the like or combination thereof.

Figure 7:
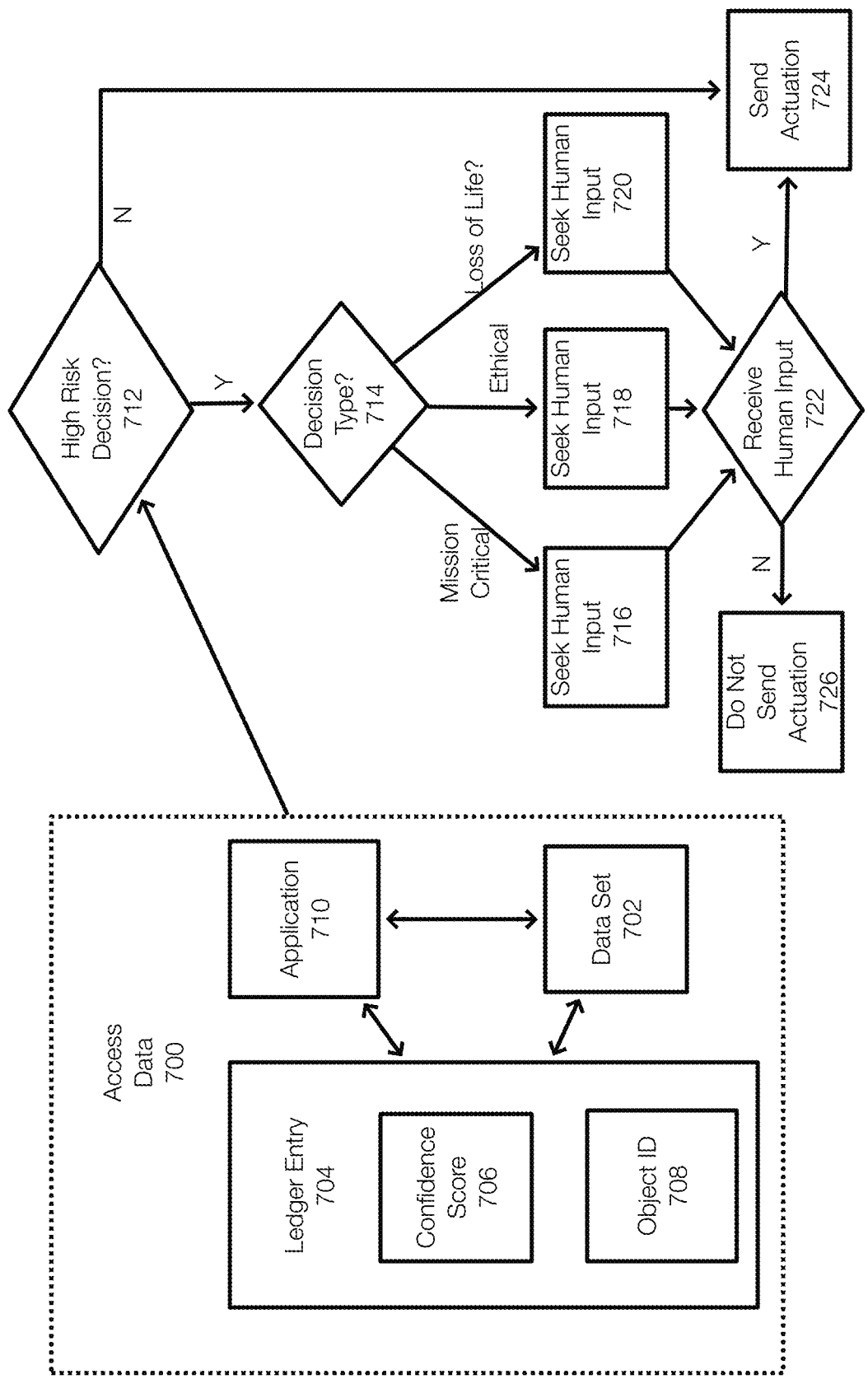
FIG. 7 illustrates a flow diagram where an application may seek human input when making decisions.

FIG. 7 illustrates an example of a process for performing decisions using a social overlay that relates one or more DCFs. FIG. 7 is discussed with reference to an application that is running within a social overlay. Because the application is running in the social overlay, the application has access to data confidence scores, data, and human confidence scores, for example.

FIG. 7 illustrates that an application may access 700 data that has been ingested into or by a machine DCF. In this example, the application 710 may access a ledger entry 704 associated with ingested data, such as the data set 702. The application 710 may also access the confidence score 706 (and/or other confidence metadata) and location or object identifier 708 from the ledger entry 704.

The application 710 may then access the data set 702 or process the data set after understanding the confidence score and/or other confidence metadata (e.g., source, provenance, individual contributions, date, time, etc.) and obtaining the location. The process of accessing data may occur in the context of a machine DCF.

During execution of the application 710, a decision point may be reached. The application may then determine 712 whether the decision is a high-risk decision or is in a grey area. A determination of No at 712 results in the application sending 724 an actuation command or performing another action in an automated manner.

A determination of Yes at 712 may cause the application to determine 714 a decision type. In this example, the decision type may be a mission critical (e.g., business related, ethical, or loss of life decision). Each type, however, leads to a step of seeking 716, 718, or 720 human input.

However, they type of human input that is requested can vary. More specifically, the analysis of the decision type may determine that the application is looking for a highly skilled person, or a dependable person, or an honest person, or other characteristic.

Because the social overlay allows access to the human DCF, confidence scores for various users can be obtained. As a result, the application may choose the user that satisfies the requirements of the decision type. When accessing the human DCF, the access may also identify the location of the user (if available) and the most recently used device or the device that most recently contributed data to the confidence score of the user.

The application, once the user is identified, may solicit feedback in various manners including, by way of example only, calling the user, texting the user, asking via a nearby audio device, prompting on an AR/VR device, or the like. Social media activity of video can also be analyzed and may result in a faster decision.

When the human input is received 722, the application can send 724 an actuation when the response is Yes (or permission is granted) or the application does not send 726 an actuation when the response is No (or permission is not granted). This process can be logged such that the decisions can be traced back to both the machine and human inputs that were used to make the decision.

Figure 8:
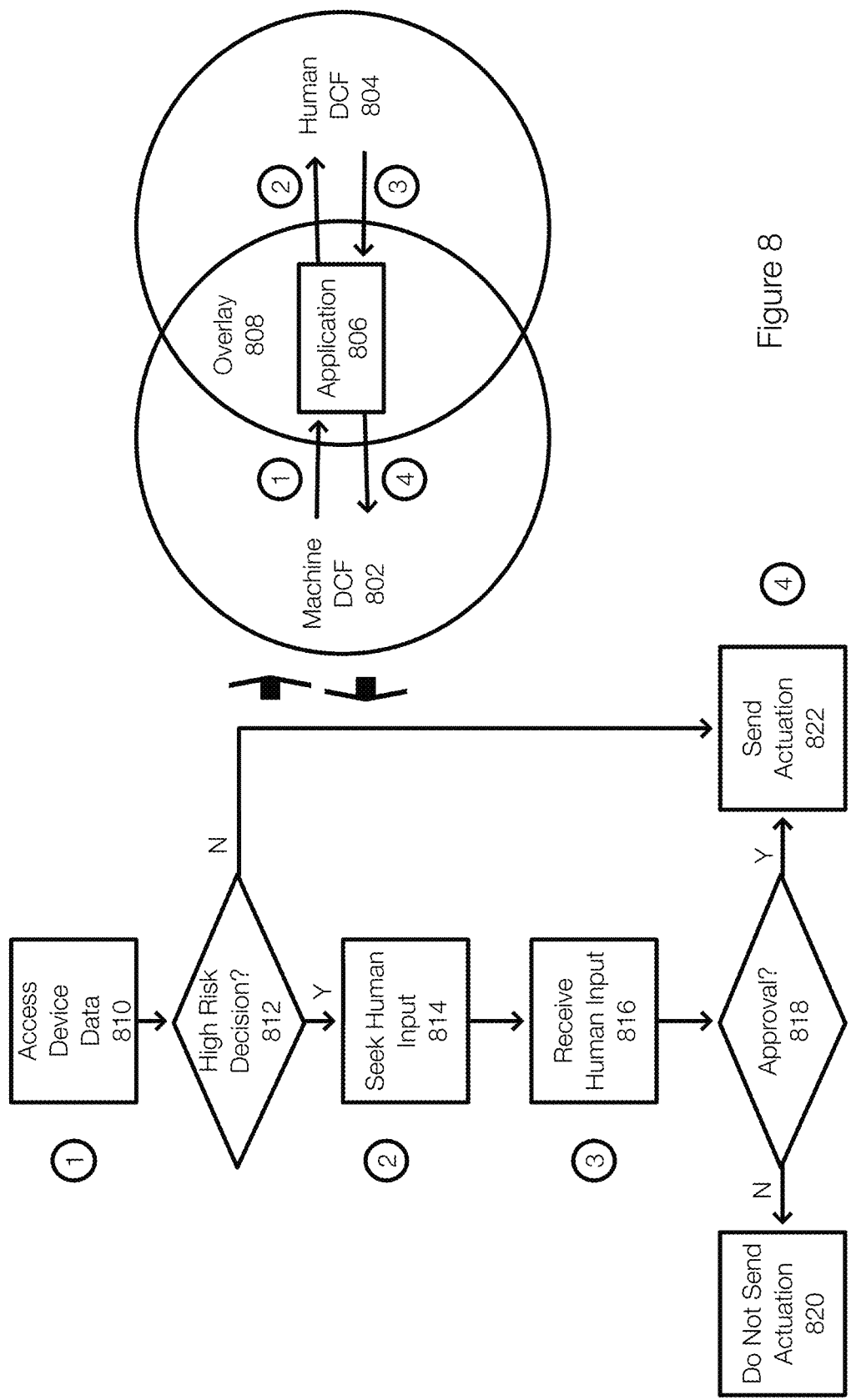
FIG. 8 further illustrates an example of a flow diagram of an application deployed to an overlay connecting data connection fabrics.

FIG. 8 further illustrates this method from the perspective of a social overlay. FIG. 8 illustrates a method where device data is accessed 810 into an application. This corresponds to the application 806 accessing the machine DCF 802 to acquire the data that has been scored by the DCF 802 at 1.

If a high-risk decision is required in 812, a yes causes the application 806 to seek human input 814. This is illustrated by the application 806 accessing the human DCF 804 at 2.

In one example, seeking 814 human input may include a search of the user confidence scores to find a suitable overall confidence score or to find a suitable confidence score for a characteristic. The search for human input may also account for factors of whether the user is available (alternative users may also be selected in case a user cannot be reached), methods for contacting the user, location of the user, or the like or combination thereof.

Seeking 814 human input may also include presenting a query to the user on a display, visually, audibly, text message, email, telephone call, or the like. Seeking 814 human input may thus include, after identifying a user based on the confidence score, contacting the user.

Next, human input is received 816 at 3. The response may come in the same communication used to contact the user, via a different method, or the like. For example, the user may first be authenticated or the like prior to accepting the received input. If the input is affirmative or approved (Y as 818), an actuation is sent 822 at 4. If the received input is negative or if permission is not granted (N at 818) the actuation is not sent 820.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, DCF operations. Such operations may include, but are not limited to, automated applications using a social overlay to seek human input, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising: accessing data from a machine data confidence fabric, seeking user input based on confidence scores of users from a human data confidence fabric with regard to a decision, receiving input from the user regarding the decision, and performing an action associated with the decision when the input from the user is affirmative.

Embodiment 2. The method of embodiment 1, further comprising accessing data and confidence scores associated with the data from the machine data confidence fabric.

Embodiment 3. The method of embodiment 1 and/or 2, further comprising determining a type of the decision.

Embodiment 4. The method of any of embodiments 1-3, further comprising determining whether to seek overall confidence scores of users or confidences scores of users that are related to specific characteristics associated with the type of the decision.

Embodiment 5. The method of any of embodiments 1-4, further comprising sending a request to a user whose confidence score is suitable for the decision.

0080 Embodiment 6. The method of any of embodiments 1-5, further comprising, sending the request via at least one of text, telephone, video, or audio.

Embodiment 7. The method of any of embodiments 1-6, further comprising receiving a response from the user.

Embodiment 8. The method of any of embodiments 1-7, further comprising seeking human input based on a location of the user.

Embodiment 9. The method of any of embodiments 1-8, further comprising, creating an overlay to connect the machine data confidence fabric with the human data confidence fabric.

Embodiment 10. The method of any of embodiments 1-9, wherein the overlay comprises at least one of: a network connection to connect the machine data connection fabric with the human data connection fabric, hardware that is shared by the machine data connection fabric and the human data connection fabric, or a cloud-integrated connection that allows an application to analyze data from multiple data connection fabrics including the machine data connection fabric and the human data connection fabric.

Embodiment 11. The method of any of embodiments 1-10, further comprising deploying an application to the overlay.

Embodiment 12. The method as recited in any of embodiments 1-11 or any portions thereof.

Embodiment 13. A non-transitory storage medium having stored therein instructions that are executable by one or more hardware processors to perform the operations of any one or more of embodiments 1-12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to the Figures, any one or more of the entities disclosed, or implied, by the Figures and/or elsewhere herein, may take the form of, or include, or be implemented on, or hosted by, a physical computing device, one example of which is denoted at. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein including, but not limited to DCF operations and operations that seek human input.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    operating an application, wherein the application accesses data from a machine data confidence fabric, wherein the machine data confidence fabric associates confidence scores with data ingested into the machine data confidence fabric;
    reaching a decision point in the application and determining that the decision point is mission critical that requires input from a user, wherein the decision point is associated with a decision type;
    accessing, by the application, a human data confidence fabric and selecting, by the application, a user that satisfies requirements of the decision type, wherein the requirements include a confidence score above a threshold confidence score, wherein the human data confidence fabric generates confidence scores for users;
    seeking user input from the selected user with regard to a decision to be made at the decision point;
    receiving input from the selected user regarding the decision; and
    performing an action associated with the decision when the input from the user is affirmative.

2. The method of claim 1, further comprising accessing the data and the confidence scores associated with the data from the machine data confidence fabric.

3. The method of claim 1, further comprising determining the decision type.

4. The method of claim 3, further comprising determining whether to seek overall confidence scores of users or confidences scores of users that are related to specific characteristics associated with the decision type.

5. The method of claim 1, further comprising sending a request to selected user.

6. The method of claim 5, further comprising, sending the request via at least one of text, telephone, video, or audio.

7. The method of claim 6, further comprising receiving a response from the selected user.

8. The method of claim 1, further comprising selecting the user based on a location of the user.

9. The method of claim 1, further comprising, creating an overlay to connect the machine data confidence fabric with the human data confidence fabric.

10. The method of claim 9, wherein the overlay comprises at least one of:
    a network connection to connect the machine data connection fabric with the human data connection fabric;
    hardware that is shared by the machine data connection fabric and the human data connection fabric; or
    a cloud-integrated connection that allows an application to analyze data from multiple data connection fabrics including the machine data connection fabric and the human data connection fabric.

11. The method of claim 10, further comprising deploying the application to the overlay.

12. A non-transitory storage medium having stored therein instructions that are executable by one or more hardware processors to perform operations comprising:
    operating an application, wherein the application accesses data from a machine data confidence fabric, wherein the machine data confidence fabric associates confidence scores with data ingested into the machine data confidence fabric;
    reaching a decision point in the application and determining that the decision point is mission critical that requires input from a user, wherein the decision point is associated with a decision type;
    accessing, by the application, a human data confidence fabric and selecting, by the application, a user that satisfies requirements of the decision type, wherein the requirements include a confidence score above a threshold confidence score wherein the human data confidence fabric generates confidence scores for users;
    seeking user input from the selected user with regard to a decision to be made at the decision point;
    receiving input from the selected user regarding the decision; and
    performing an action associated with the decision when the input from the user is affirmative.

13. The non-transitory storage medium of claim 12, further comprising accessing the data and confidence scores associated with the data from the machine data confidence fabric.

14. The non-transitory storage medium of claim 12, further comprising determining the decision time and determining whether to select the user based on overall confidence scores of users or confidences scores of users that are related to specific characteristics associated with the decision type.

15. The non-transitory storage medium of claim 12, further comprising sending a request to the selected user.

16. The non-transitory storage medium of claim 15, further comprising, sending the request via at least one of text, telephone, video, or audio.

17. The non-transitory storage medium of claim 15, further comprising receiving a response from the selected user.

18. The non-transitory storage medium of claim 12, further comprising selecting the user based on a location of the user.

19. The non-transitory storage medium of claim 12, further comprising, creating an overlay to connect the machine data confidence fabric with the human data confidence fabric and deploying an application to the overlay.

20. The non-transitory storage medium of claim 19, wherein the overlay comprises at least one of:
- a network connection to connect the machine data connection fabric with the human data connection fabric;
- hardware that is shared by the machine data connection fabric and the human data connection fabric; or
- a cloud-integrated connection that allows an application to analyze data from multiple data connection fabrics including the machine data connection fabric and the human data connection fabric.

* * * * *